(12) United States Patent
Edwards

(10) Patent No.: US 6,484,811 B1
(45) Date of Patent: Nov. 26, 2002

(54) MULCHING UNIT FOR USE IN MULCHING APPARATUS

(75) Inventor: John W. Edwards, 7269 Bec Ridge Rd., Sarasota, FL (US) 32424

(73) Assignee: John W. Edwards, Sarasota, FL (US)

( * ) Notice: Subject to any disclaimer, the term of this patent is extended or adjusted under 35 U.S.C. 154(b) by 0 days.

(21) Appl. No.: 09/503,935

(22) Filed: Feb. 14, 2000

Related U.S. Application Data

(63) Continuation of application No. 09/334,953, filed on Jun. 17, 1999, now Pat. No. 6,269,559.

(51) Int. Cl.$^7$ ............................................... A01B 23/02
(52) U.S. Cl. ..................... 172/21; 172/123; 172/542; 172/545; 172/550; 172/553
(58) Field of Search ............................ 172/21, 31, 123, 172/719, 748, 765–772.5, 537, 545, 542, 554, 553, 550

(56) References Cited

U.S. PATENT DOCUMENTS

| | | | | |
|---|---|---|---|---|
| 502,301 | A | * | 8/1893 | Kime |
| 1,196,954 | A | * | 9/1916 | Huebsch |
| 1,362,409 | A | * | 12/1920 | Forker |
| 1,802,711 | A | * | 4/1931 | Fitts |
| 2,538,167 | A | * | 1/1951 | Schmeiser |
| 2,636,291 | A | * | 4/1953 | Reagle ......................... 37/191 |
| 3,085,633 | A | * | 4/1963 | Holst ........................... 172/16 |
| 4,611,669 | A | * | 9/1986 | Ballard ........................ 172/545 |
| 4,706,761 | A | * | 11/1987 | Herscher et al. ........ 172/545 X |
| 5,813,792 | A | | 9/1998 | Edwards |

OTHER PUBLICATIONS

Brochure entitled "The Mulcher" by Magnum Mulching Mowers, Inc. Applicant's understanding is that the subject matter in this brochure was in the public domain more than one year before the filing date of this application.

Construction Tools by Kennametal. Applicant's understanding is that the subject matter of this brochure was in the public domain more than one year before the filing date of this application.

Little Industries, Brochure (no date, but considered prior art as to this application).

Menzi U.S.A. Sales, Inc., Brochure (no date, but considered prior art as to this application).

Attachments Unlimited, Brochure(no date, but considered prior art as to this application).

Rayco T275 Site Preparation, Brochure (no date, but considered prior art as to this application).

Carlson Tractor & Equip. Co., Brush Cutting Equipment Brochure–Seppi Flail Mower (no date, but considered prior art as to this application).

Fecon Resource Recovery Equipment & Systems, Bull Hog Brochure, (no date, but considered prior art as to this application).

(List continued on next page.)

Primary Examiner—Christopher J. Novosad
(74) Attorney, Agent, or Firm—Oliff & Berridge, PLC

(57) ABSTRACT

A mulching unit for a mulching apparatus includes at least one cutting assembly or hammer having a rotatable support element and two cutting elements spaced apart from one another by a predetermined gap that allows debris to pass between the cutting elements, thereby increasing efficiency and enabling higher rotating speeds for sustained amounts of time. The cutting elements include tips that may be formed in one piece with the support element, e.g., a collar, and the tips may be covered with a protective layer of tungsten and/or carbide. Alternatively, the tips themselves can be made from tungsten and/or carbide and physically attached, e.g., by welding, to the collar to form an integral unit. The cutting elements may be mounted on support element halves that can independently rotate on a support rod of the mulching unit.

9 Claims, 15 Drawing Sheets

OTHER PUBLICATIONS

Geo–Boy Brush cutter Tractor with a Seppi M. Forrest 225 Cutter Head Brochure, (no date, but considered prior art as to this application).

John Brown & Sons, Inc., the Brown Brontosaurus Brochure, (no date, but considered prior art as to this application).

Forestry–Agricultural Equipment, Forrestry Mower Medium Brochure, (no date, but considered prior art as to this application).

Rowmec Equipment Co., "T7 Rowmec R.O.W. King –Land Clearing Machine", Nov. 1999, Heavy Equipment News Publication.

Brown Bear FS 4000 Forestry Shredder Tractor, Brochure (no date, but considered prior art as to this application).

Coneqtec Universal, Brochure(no date, but considered prior art as to this application).

Asphalt Zipper Company, "The Asphalt Zipper", Nov. 1999, Heavy Equipment News Advertisement.

Berthelotp, Eric, "Gyro–Trac Introduces its New GT–18 XP", Apr. 1999, Messek publication.

R.F. Shinn Contractor, Inc., Shinn Cutter Systems Brochure (no date, but considered prior art as to this application).

Rowmec, TS R.O.W. King –Land Clearing Machine Brochure (no date, but considered prior art as to this application).

Alamo Industrial, Brochure (no date, but considered prior art as to this application).

\* cited by examiner

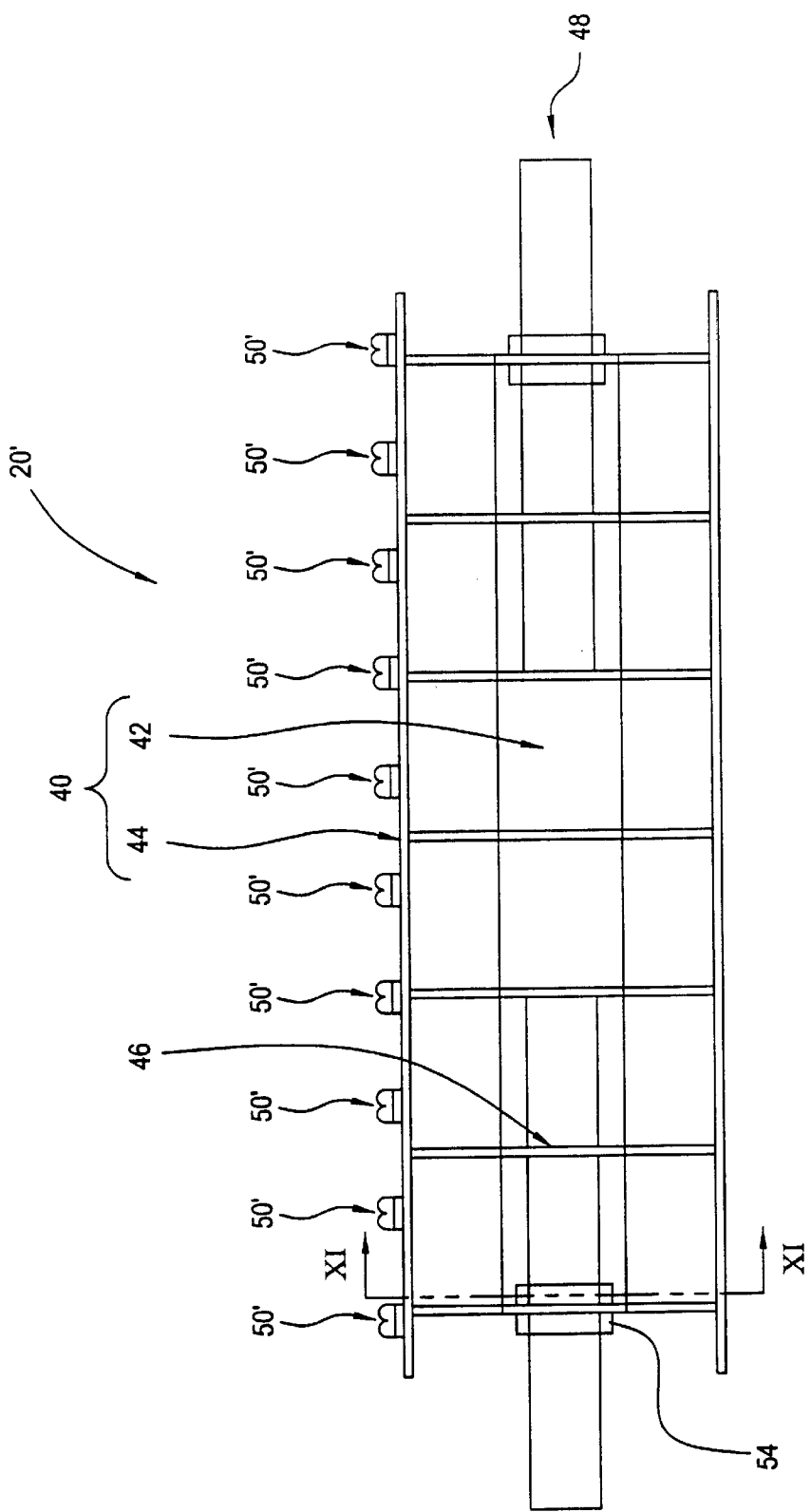

MULCHING UNIT FOR USE IN MULCHING APPARATUS

This is a continuation-in-part of application Ser. No. 09/334,953 filed Jun. 17, 1999, now U.S. Pat. No. 6,269,558. The entire disclosure of the prior application is hereby incorporated by reference herein in its entirety.

BACKGROUND OF THE INVENTION

1. Field of Invention

This invention relates to an industrial mulching apparatus for use in mulching vegetation such as brush, trees, etc., or stump grinding. In particular, this invention relates to improvements to a mulching unit including a plurality of cutting assemblies that serially engage and mulch the intended vegetation in rapid fashion.

2. Description of Related Art

FIGS. 1–4C show a related art mulching apparatus 10. The mulching apparatus 10 includes a tractor 12 supported on a set of wheels 14. The tractor driver can sit within a protected cage 16 positioned on a frame of the mulching apparatus 10. A hydraulic unit 18 connected to the tractor 12 provides a means by which a mulching unit 20 is positioned, e.g., laterally shifted, raised and lowered. The tractor 12 is commercially available from Barco, a manufacturer of tractors. Also, many details of the mulching apparatus 10 shown in FIG. 1 are described in U.S. Pat. No. 5,813,792 herein incorporated by reference in its entirety.

The tractor 12 is provided with one or more power sources, e.g., motors, sufficient to drive the tractor at a desired speed and to rotate the mulching unit 20 in the direction of arrow A. The mulching unit 20 can rotate at a speed of about 1,700 rpm, for example. The mulching unit 20 includes a plurality of cutting assemblies or hammers 26 that are axially spaced along the length of the mulching unit 20. A plurality of spacers 27 are provided between each of the cutting hammers 26. The spacers 27 define sector shaped portions in which each of the hammers 26 pivots over a limited range. Movement within the sector shaped portion is in addition to the overall rotation of the mulching unit 20 in the direction of arrow A shown in FIG. 1. Centrifugal force causes each of the cutting hammers 26 to pivot radially beyond the limits of each spacer 27 to thereby engage brush, trees or other vegetation.

FIG. 2 is an enlarged view of the mulching unit 20. The cutting hammers 26 alternate with the spacers 27, and the hammers 26 pivot within each sector shaped portion defined by the spacers 27. The hammers 26 in one row are staggered with respect to the hammers 26 in adjacent rows to obtain a substantially continuous cutting profile.

FIG. 3 schematically shows the mulching unit 20 to include a pair of end plates 22 and a plurality of support rods 24. Each support rod 24 includes a plurality of cutting hammers 26. For example, each support rod 24 holds 10 to 12 cutting hammers 26. The cutting hammers 26 are freely rotatable about the support rods 24, and are sometimes referred to as "flail" mulchers or mowers.

FIG. 4A shows an enlarged view of the cutting hammer 26. In FIG. 4A, the cutting hammer 26 includes a through hole 28 defining an inner support surface that is slidably and rotatably mounted on one of the support rods 24 shown in FIG. 3. The through hole 28 is partly defined by a collar 30 on which a cutting element 32 is formed. In operation, a distal end portion of the cutting element 32 wears away or erodes due to repetitive high speed impact with vegetation, the ground, etc. As such, it is necessary to replace the cutting element 32, which also requires replacement of the collar 30 since it is formed in one piece with the cutting element 32. Generally, this is done by disassembling one or both of the end plates 22 from the support rods 24, as shown in FIG. 3, and then sliding the collar 30 until the cutting hammer 26 disengages with the support rod 24. In this manner, one or more of the spent cutting hammers 26 can be replaced with new cutting hammers 26.

FIG. 4B shows another example of a related art cutting hammer 26' that is similar to the cutting hammer 26 shown in FIG. 4A. The main difference is that the cutting hammer 26' is double-ended and includes first and second cutting elements 32A and 32B. Thus, when one of the cutting elements 32A is spent, one or both of the end plates 22 (FIG. 3) can be detached from the support rods 24, and the cutting hammer 26' can be removed from the support rod 24 and reassembled in an opposite orientation such that the fresh or unspent cutting element 32A, rather than the spent cutting element 32B, engages with the intended vegetation. Otherwise, the cutting hammers 26 and 26' are identical in operation.

FIG. 4C is representative of a right side elevation view of either of the cutting hammers 26 or 26'. The cutting elements 32 and 32B (as well as the cutting element 32A) are generally flat and blade-like and are roughly equal in width to the width of the collars 30, 30'. This is disadvantageous because the flat and blade-like shape of the cutting elements 32 and 32B results in excessive frictional contact with the intended vegetation or the ground during the mulching operation. In particular, any dirt or other debris that comes in contact with the blade member must be directed completely around each cutting element 30 or 32', which causes undue strain on the motor or power source of the tractor 12.

Another disadvantage with the related art structure shown in FIG. 1 is that the mulching unit can become misaligned if the mulching unit impacts various obstacles during operation. For example, the assembly of the end plates 22 and support rods 24 may not sufficiently resist deformation when impacting obstacles during the mulching operation.

Another related art mulching apparatus includes a rotatable drum having bullet-like cutting elements fixedly attached to the outer surface of the drum. These cutting elements are made from tungsten or carbide and are commonly used in asphalt grinding machines. However, deformation of the drum unit is problematic because it has a relatively fragile structure not well suited to resisting impact.

SUMMARY OF THE INVENTION

One aspect of the invention relates to providing a mulching apparatus including a mulching unit and/or cutting assembly with improved cutting efficiency and cost-effectiveness for labor and/or replacement parts. Another aspect of the invention relates to retrofitting mulching units of the related art with a new and improved cutting assembly that improves cutting efficiency and cost-effectiveness for labor and/or replacement parts. Another aspect of the invention concerns reducing the amount of labor required to replace spent parts.

According to one preferred embodiment of the present invention, a mulching apparatus comprises a tractor and a mulching unit coupled to and receiving power from the tractor. The mulching unit includes at least one cutting hammer having a rotatable support element and at least two cutting elements spaced apart from one another to define a predetermined gap. The cutting elements may be welded or otherwise attached to the support element, or they may be formed in one piece with the support element.

According to another preferred embodiment of the present invention, a cutting assembly for use with a mulching unit of a mulching apparatus comprises a support element having a collar defining an inner surface rotatably and slidably mounted to a support rod of the mulching unit, and at least first and second cutting elements provided to the collar and being spaced apart from one another by a predetermined gap.

According to yet another preferred embodiment of the present invention, a cutting hammer for use with a mulching unit comprises a support element having first and second support element halves independently rotatable on a support rod of the mulching unit, and first and second cutting elements provided to the first and second support element halves, respectively.

These and other aspects of the invention will be described in or apparent from the following detailed description of preferred embodiments.

BRIEF DESCRIPTION OF THE DRAWINGS

Preferred embodiments of the present invention will be described in conjunction with the following drawings, in which like reference numbers refer to like parts, and wherein:

FIGS. 10–12 illustrate yet another preferred embodiment of a mulching unit according to the present invention.

DETAILED DESCRIPTION OF PREFERRED EMBODIMENTS

Figure 5:
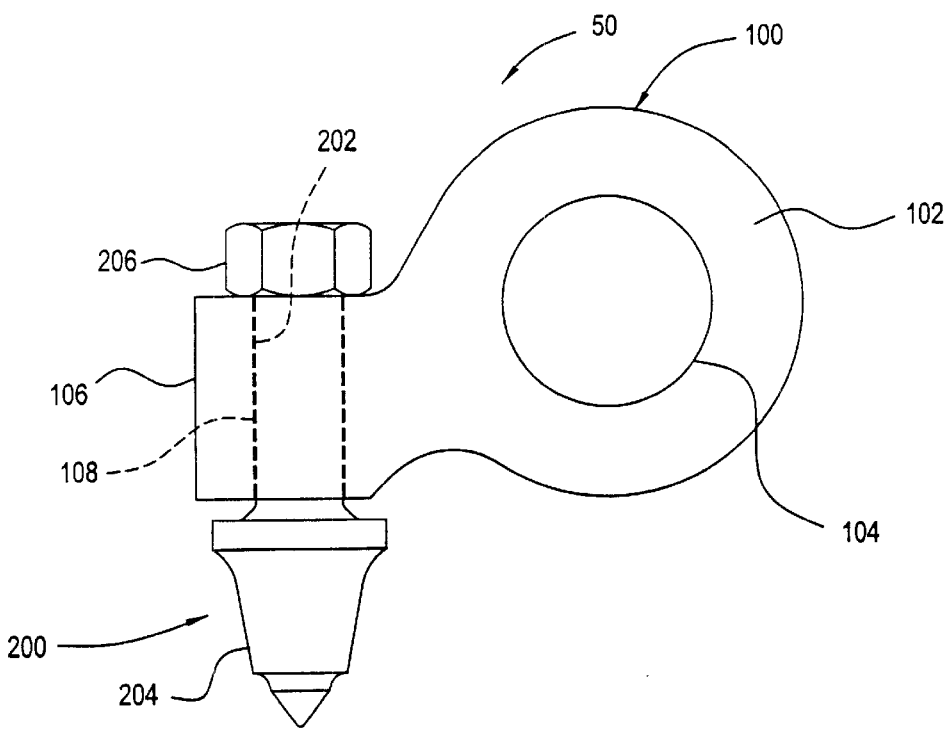
FIG. 5 shows a cutting assembly according to a preferred embodiment of the present invention.
Figure 6:
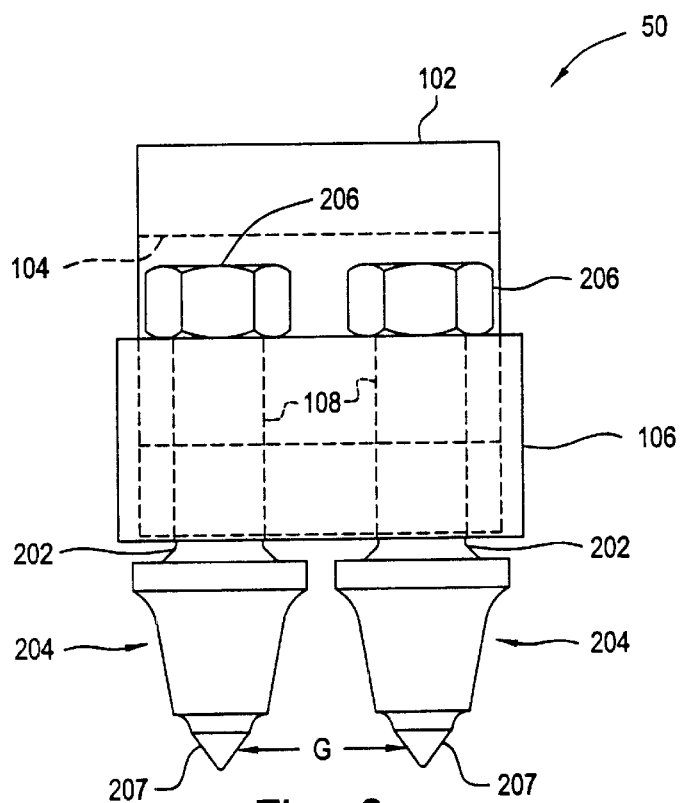
FIG. 6 is a left side elevation view of the cutting assembly shown in FIG. 5.

FIGS. 5 and 6 illustrate a cutting assembly or hammer 50 including a support element 100 and a cutting element 200.

Figure 7:
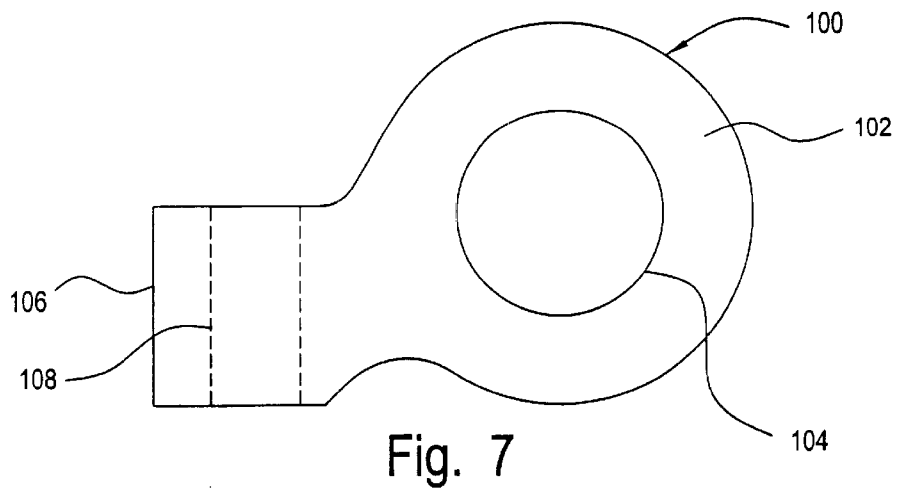
FIG. 7 illustrates the support element shown in FIG. 5, without the cutting element.
Figure 8:
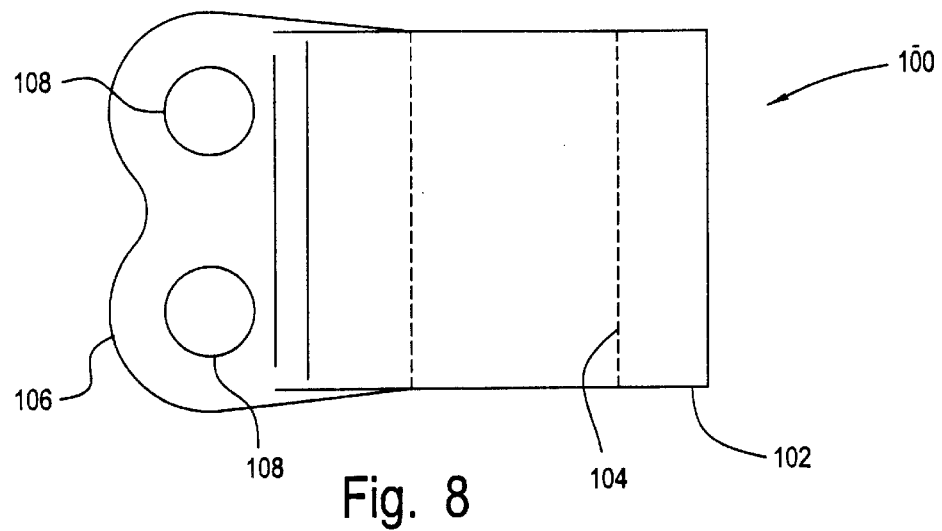
FIG. 8 is a top elevation view of the support element shown in FIG. 7.
Figure 8A:
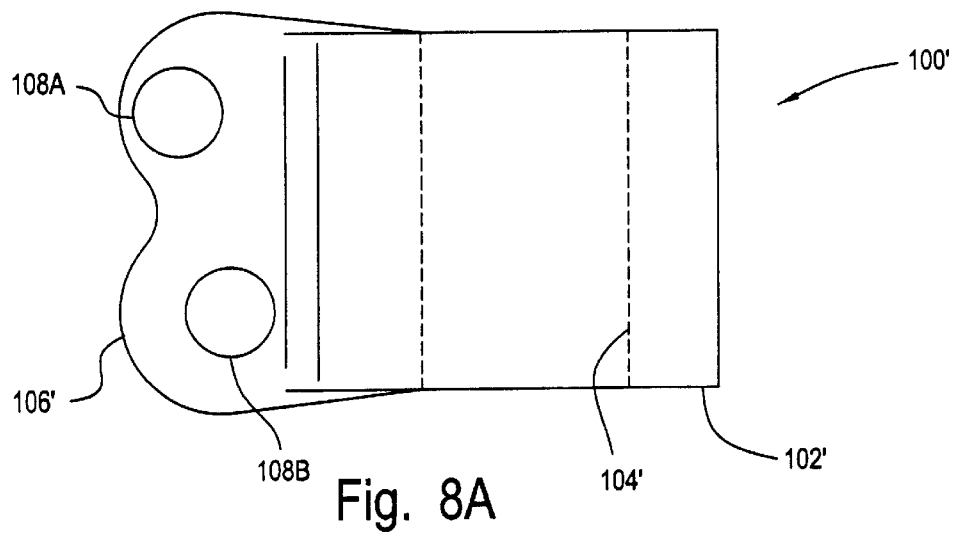
FIG. 8A illustrates an alternative preferred embodiment of a support element according to the present invention.
Figure 9C:
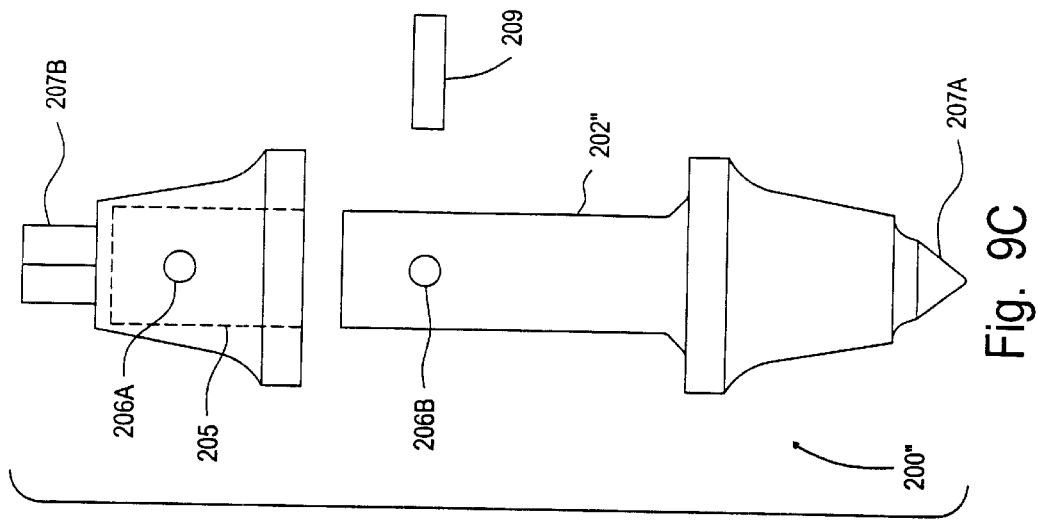
FIG. 9C illustrates yet another preferred embodiment of a cutting element and fastener according to the present invention.
Figure 9B:
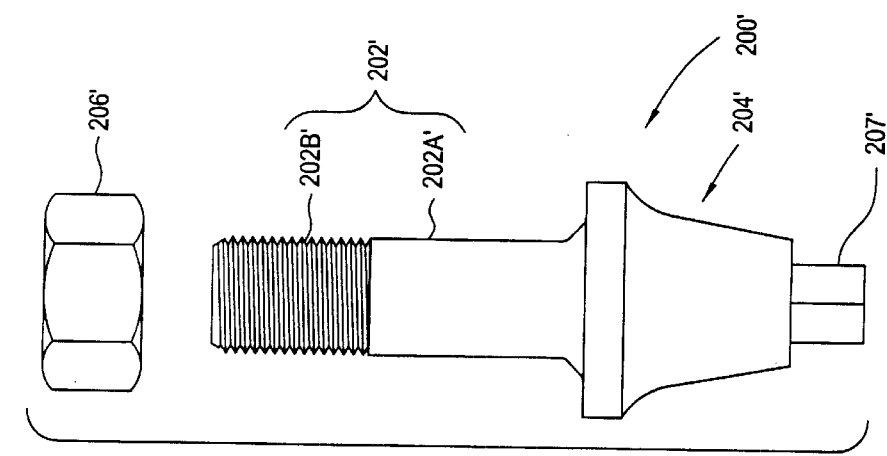
FIG. 9B illustrates a cutting element and fastener according to another preferred embodiment of the present invention.
Figure 9A:
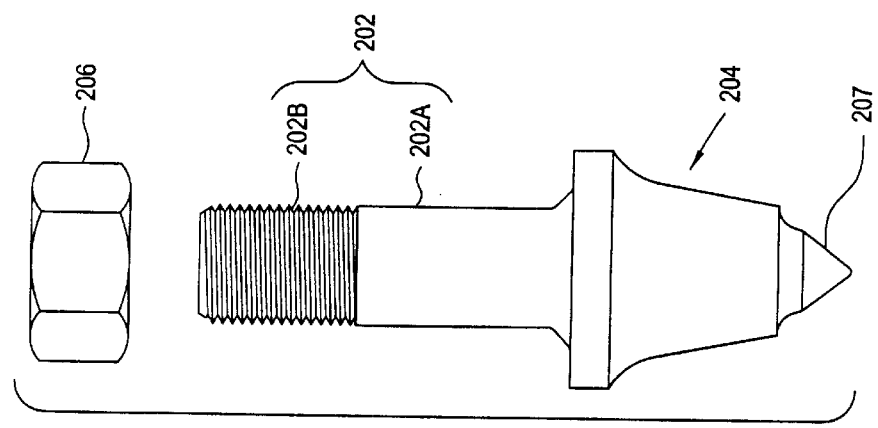
FIG. 9A illustrates a cutting element and fastener according to a preferred embodiment of the present invention.

FIGS. 7, 8 and 8A illustrate the support element 100 without the cutting element, and FIGS. 9A–9C illustrate various embodiments of the cutting element 200, 200', 200" without the support element.

With reference to FIG. 5, the support element 100 includes a base member in the form of a collar 102 that defines a through hole having an inner support surface 104. The inner support surface 104 is slidably and rotatably mounted one of a plurality of support rods 24 (shown in FIG. 3). Approximately 10 to 12 support elements 100 (weighing 8–10 lbs. each) are provided on each support rod 24. The collar 102 is integrally coupled to a cutting element holder member 106. The collar 102 and holder member 106 may be welded together, or they may be cast of molten metal in a single mold and formed as a single piece. The holder member 106 includes at least one through hole 108.

Figure 4A:
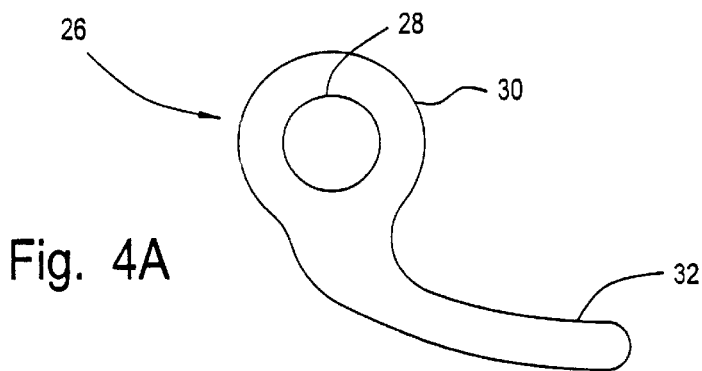
FIG. 4A shows a first embodiment of a cutting hammer according to the related art.
Figure 4B:
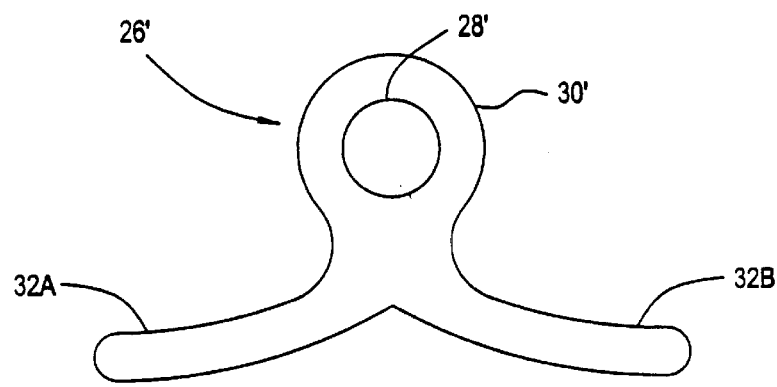
FIG. 4B shows a second embodiment of a cutting hammer according to the related art.
Figure 4C:
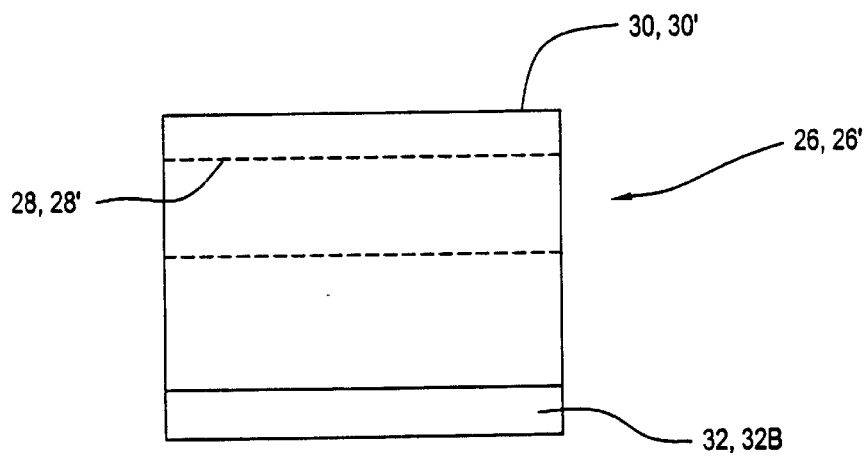
FIG. 4C shows a right side elevation view of the cutting hammer shown in FIGS. 4A or 4B.

As shown in FIG. 6, for example, the holder member 106 includes two through holes 108. Each through hole 108 is intended to releasably and/or rotatably receive one of the cutting elements 200. A gap G is formed between two cutting members 204 of the cutting elements 200. Each cutting member 204 includes a shaped cutting tip 207. The gap G is beneficial because it allows dirt and other debris to flow between the cutting elements 200, as distinguished from the blade like cutting hammer 26 shown in related art FIGS. 4A–4C. It is also beneficial to allow the cutting elements 200 to rotate within the through holes 108 to further facilitate movement of the debris past and between the cutting members 204. The cutting assembly 50 allows a 30% reduction in the amount of time required for mulching vegetation, e.g., large trees having a diameter of 24"–36" or larger, as compared to the cutting blades 26 of the related art.

Each cutting element 200 includes a shaft 202 defining first and second ends. The first end of the shaft 202 includes the shaped cutting tip 207, which is preferably made of a hard material such as tungsten and/or carbide which is resistant to abrasion and frictional contact. The shaped cutting tip 207 should also be resistant to impact as well. A second end of the shaft 200 includes a fastening element, such as a nut 206, that is threaded onto a threaded portion 202A of the shaft 202 (FIG. 9A). It is not necessary to thread the entire length of the shaft 202-a portion 202B of the shaft 202 may remain smooth and unthreaded, as shown in FIG. 9A. The cutting element 200 is releasably mounted to the support element and therefore can be easily replaced without requiring replacement of the support element 100 or undue labor.

FIG. 7 illustrates the support element 100 shown in FIG. 5, but the cutting element has been removed for clarity of illustration. FIG. 8 is a top elevation view of the support element 100 of FIG. 7.

FIG. 8A is an alternative preferred embodiment of a support element 100' according to another preferred embodiment of the invention. In FIG. 8A, the support element 100' includes first and second through holes 108A and 108B. The through hole 108A is offset from the through hole 108B such that the a cutting element positioned within the through hole 108A contacts the vegetation slightly before the cutting element positioned within the through hole 108B contacts the same vegetation. In this manner, energy drain to the power source of the tractor can be stepwise applied, which reduces shock to the energy source. Thus, the mulching unit 20 can run smoothly and with less interruption required to power up to the proper rpm.

FIG. 9A shows the cutting element 200 shown in FIGS. 5 and 6. In FIG. 9A, the nut 206 is threadably attached to the threaded portion 202A of the shaft 202 of the cutting element 200. In an arrangement not shown, a standard bolt can be used if the cutting member 204 is suitably threaded. To reduce the possibility of the nut 206 becoming detached from the threaded portion 202 during high speed operation, it is also possible to additionally tack weld the nut 206 onto the shaft 202. Alternatively, the nut 206 can be replaced with a locking nut or a locking pin arrangement, so that the cutting elements 200 can be easily replaced. The cutting element 200 shown in FIG. 9A is the type commercially available for use in an asphalt grinding machine.

FIG. 9B shows an alternative embodiment of a cutting element 200' according to the present invention. The cutting element 200' shown in FIG. 9B is similar to the cutting element shown in FIG. 9A, but includes a square ended shaped cutting tip 207' that is particularly useful for cutting vegetation. The cutting tip could also have other polygonal or symmetrical cross sections, such as triangles, hexagons, etc.

FIG. 9C shows yet another embodiment of the present invention. The cutting element 200'' includes first and second shaped cutting tips 207A and 207B. The first shaped cutting tip 207A may be similar to the shaped cutting tip 207 shown in FIG. 9A, while the second shaped cutting tip 207B may be similar to the shaped cutting tip 207' shown in FIG. 9B. The second shaped cutting tip 207B may include a threaded assembly (not shown) which is threaded onto the shank 202'', like the nut 206 or 206' in FIGS. 9A and 9B, respectively, or an alternative fastening mechanism can be used, such as a quick release mechanism that facilitates removal or reversal of the cutting element 200''. For example, the second shaped cutting tip 207B may include a blind bore 205 that can receive the shaft 202''. When a hole 206A on the shaped cutting tip 207B aligns with a hole 206B formed on the shank 202'', a separate pin member 209 can be inserted into both holes 206A and 206B, thus forming a mechanical lock. Additionally, the holes 206A and 206B can also coincide with another hole (not shown) formed in the holder member 106, 106' of the support element 100, 100'. Also, although different shaped cutting tips are shown in FIG. 9C, the shaped cutting tips 207A and 207B may also be identical.

The use of the cutting elements 200, 200' or 200'', especially if used in conjunction with the support element 100' of FIG. 8A, can enable significant improvements in cutting speed as well as the ability to cut large trees up to 24"–36" in diameter or larger.

Figure 11:
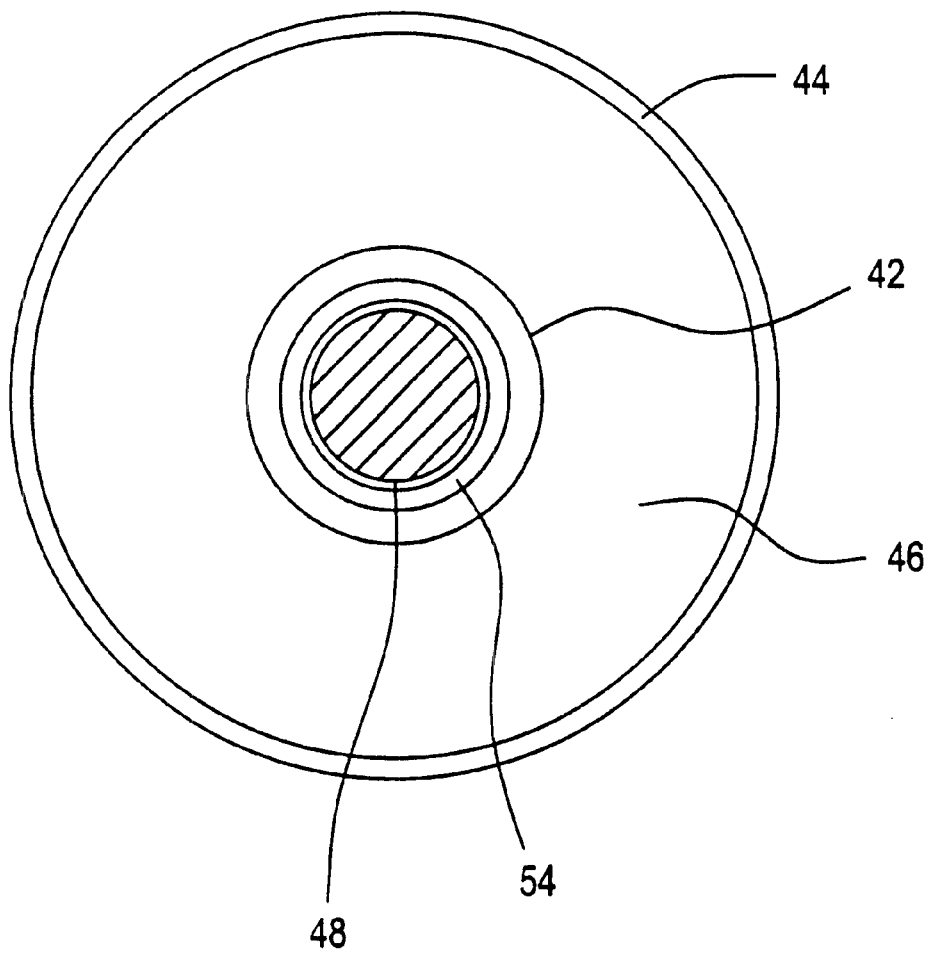
Figure 12:
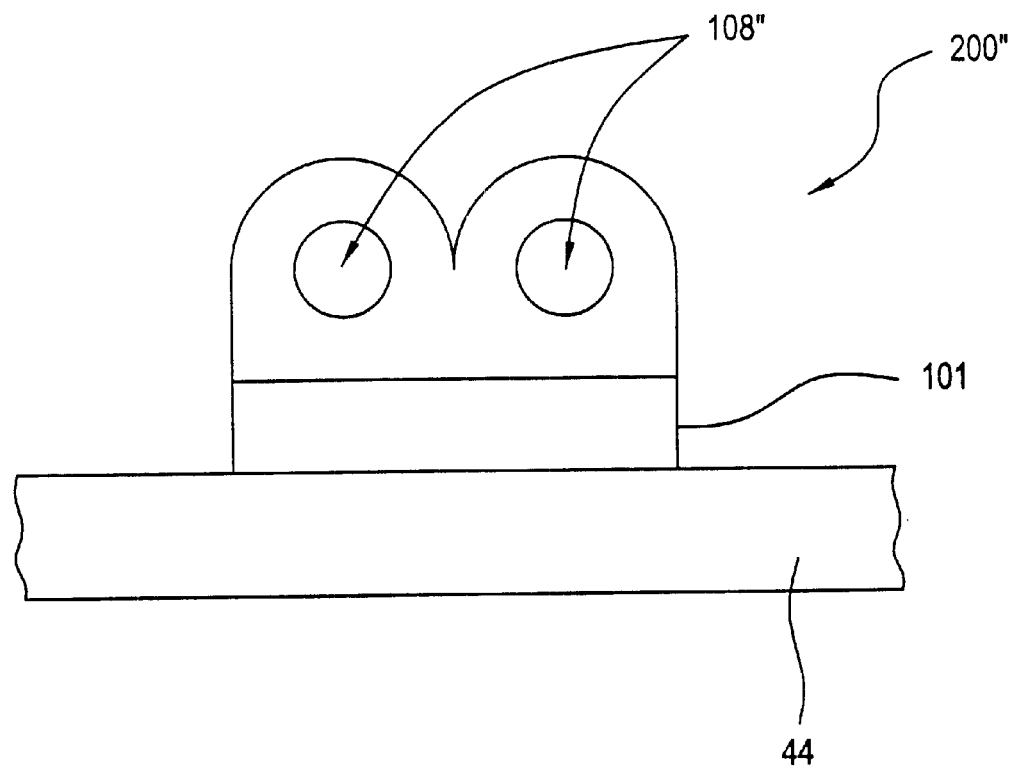

FIGS. 10–12 show an alternative embodiment of a mulching unit 20'. The mulching unit 20' includes a rotating tube assembly 40 including an inner tube member 42 and an outer tube member 44. The inner tube member 42 passes through a series of bracing rings 46 connecting the inner and outer tube members 42 and 44. The bracing rings 46 help improve the structural integrity of the mulching unit 20'. The relationship between the inner and outer tube members 42 and 44 and the bracing rings 46 is shown in FIG. 11, which is a cross-sectional view along section XI—XI of FIG. 10. A shaft 48 is supplied with power from a power source for the mulching unit 20'. A bushing 54 is interposed between the shaft 48 and at least the outermost bracing rings 46.

The outer tube member 44 includes a plurality of rows of cutting assemblies 50'. In the example shown, each row includes about 12 cutting assemblies 50'. In addition, although not shown in FIG. 10, the cutting elements in one row are staggered from the cutting elements in the adjacent rows so that a substantially continuous cutting profile can be formed as the mulching unit 20' is rotated.

Figure 1:
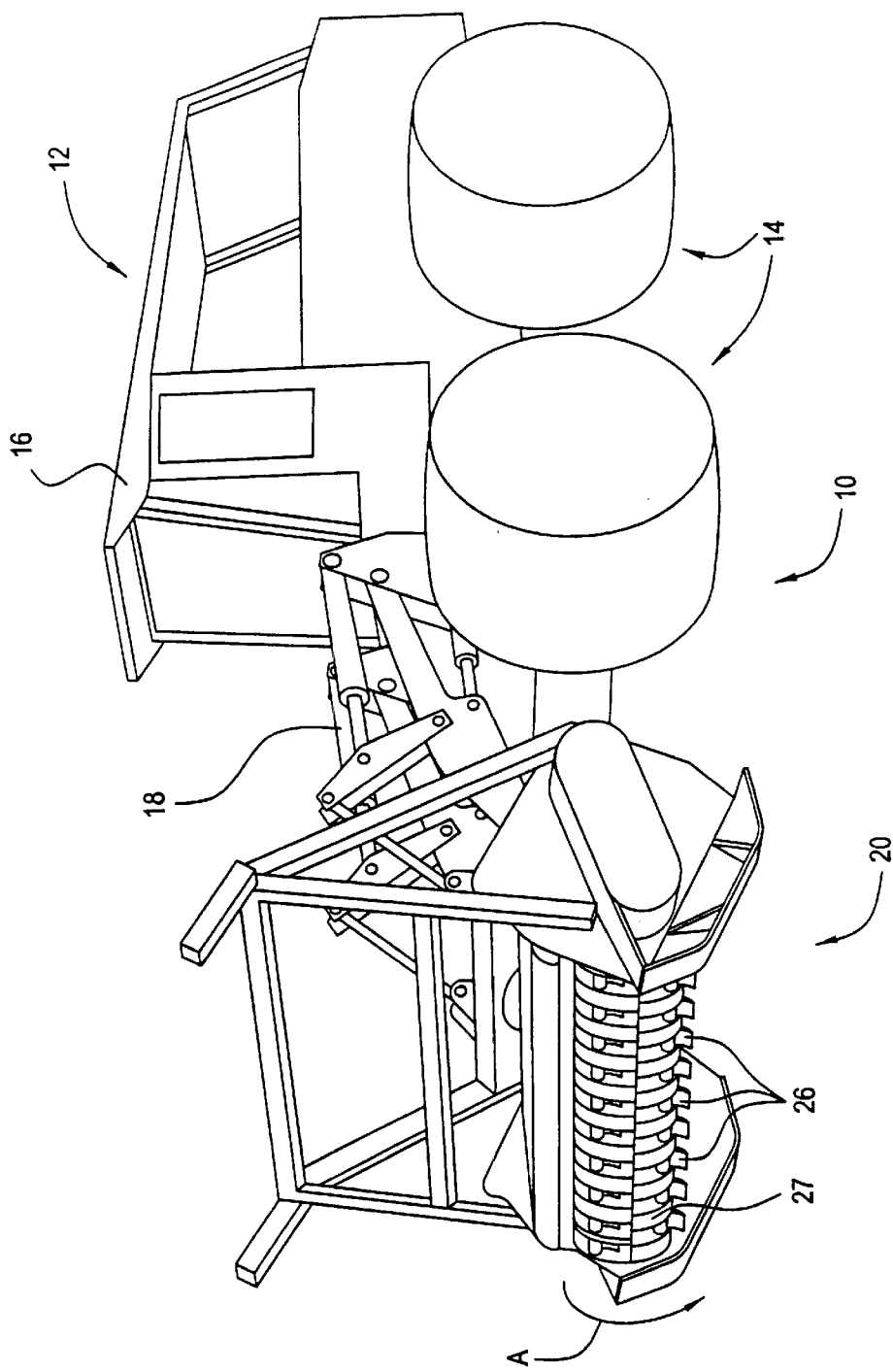
FIG. 1 illustrates a mulching apparatus according to the related art.
Figure 2:
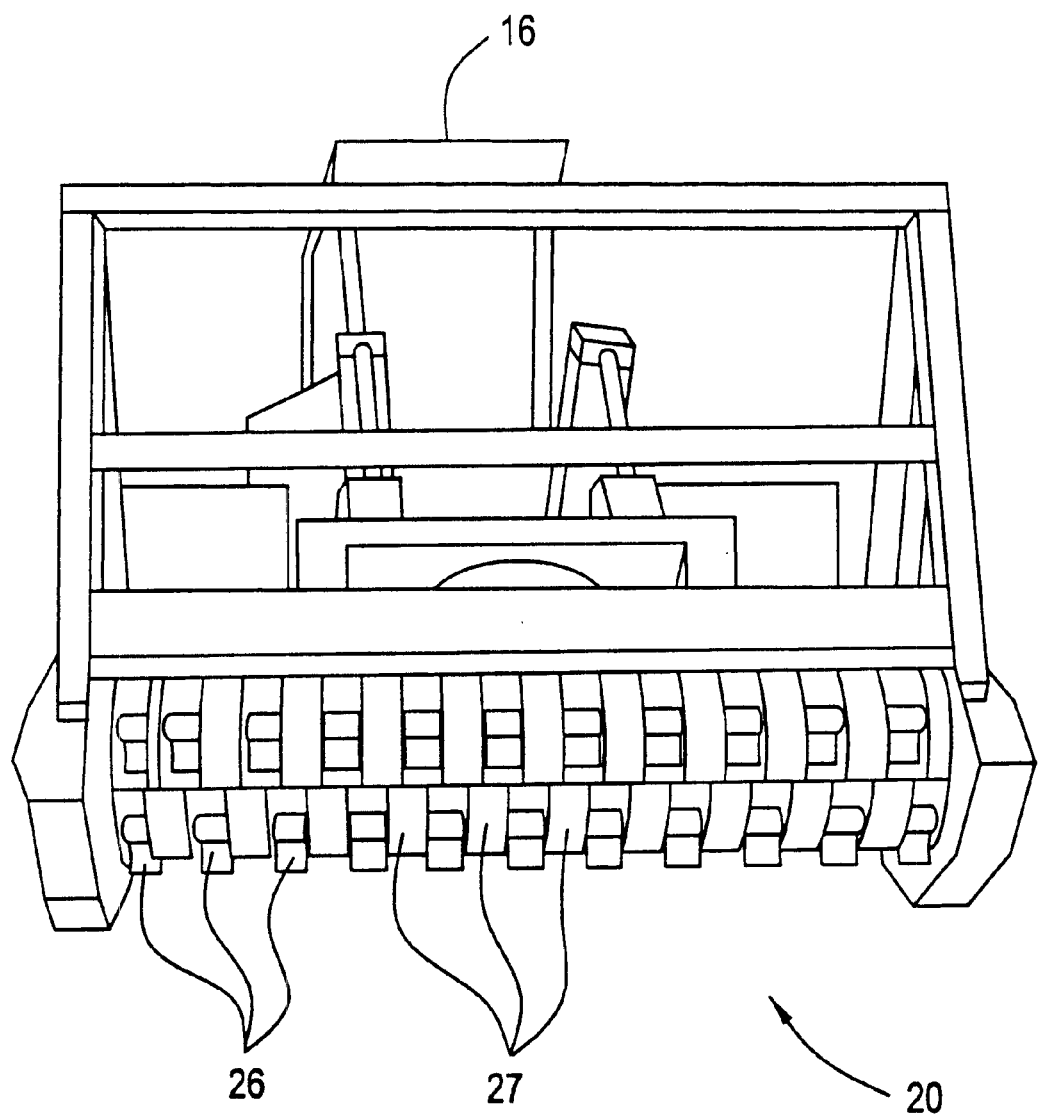
FIG. 2 is an enlarged view of the mulching unit shown in FIG. 1.
Figure 3:
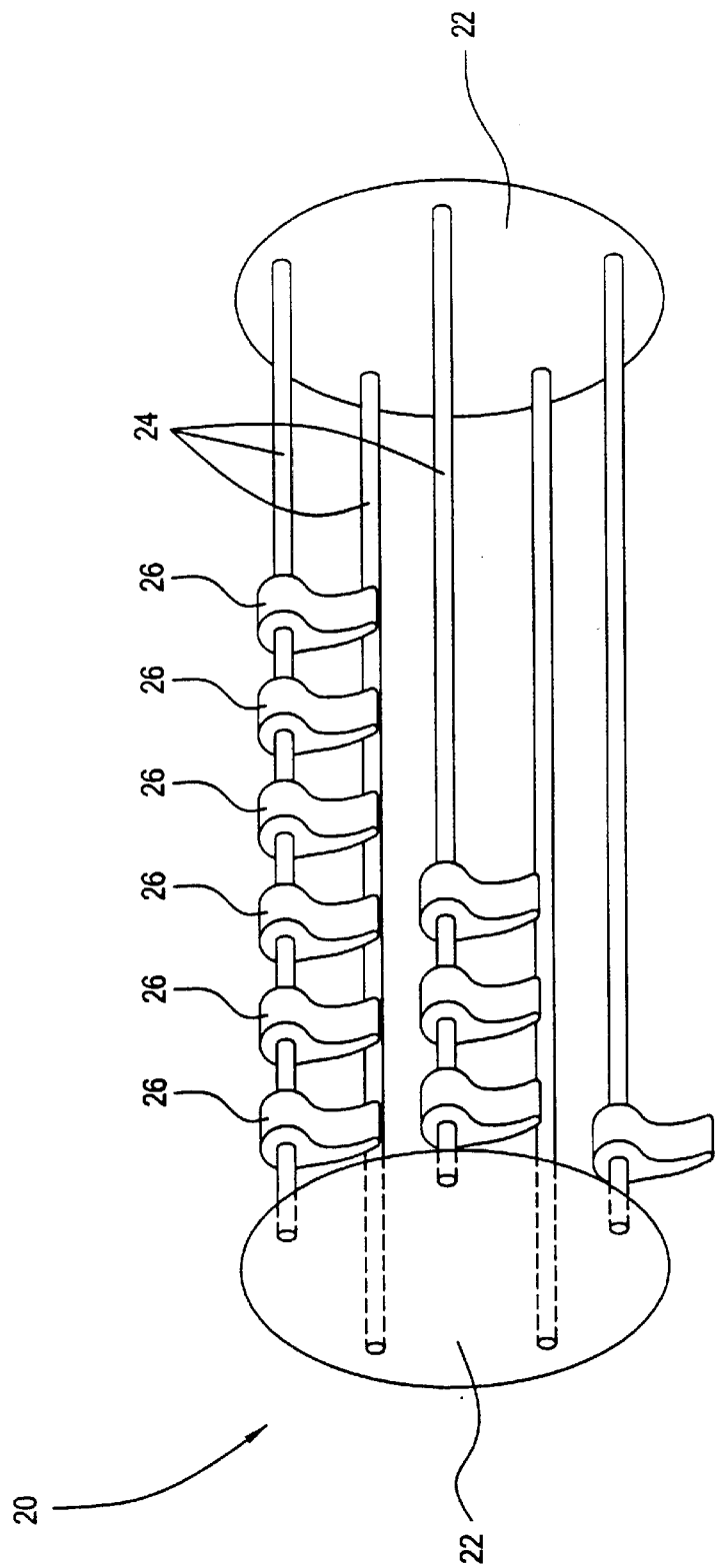
FIG. 3 is a schematic view of the mulching unit shown in FIGS. 1 and 2.

Each cutting assembly 50' is fixedly mounted on an outer surface of the outer tube member 44. As such, each cutting assembly 50' is not mounted on a support rod 24, as shown in FIG. 3. Rather, the support element 100' includes a base member in the form of a substantially flat or slightly curved plate member 101 that is fixedly mounted onto the outer surface of the outer tube member 44. The plate member 101 can be welded or otherwise bolted to the outer tube member 44. In FIG. 12, the cutting elements are not shown for clarity, but can be similar to those shown in FIGS. 9A–9C and FIGS. 13–17, described below. Although the through holes 108'' are shown as being uniformly spaced from the outer surface of the outer tube member 44, they also may be offset in the manner shown in FIG. 8A.

The structure shown in FIGS. 10–12 is advantageous since there is no requirement to form a collar or to assemble the collar onto the support rod 24, as in the embodiments of FIGS. 5–8A. Also, like the earlier described embodiments, it is not necessary to remove the base member (plate member 101) from the mulching unit 20' to replace the cutting elements. The double walled tube assembly 40 also improves resistance to warping or bending when the mulching unit 20' encounters obstacles that tend to bend or otherwise warp the mulching unit 20'.

Figure 13:
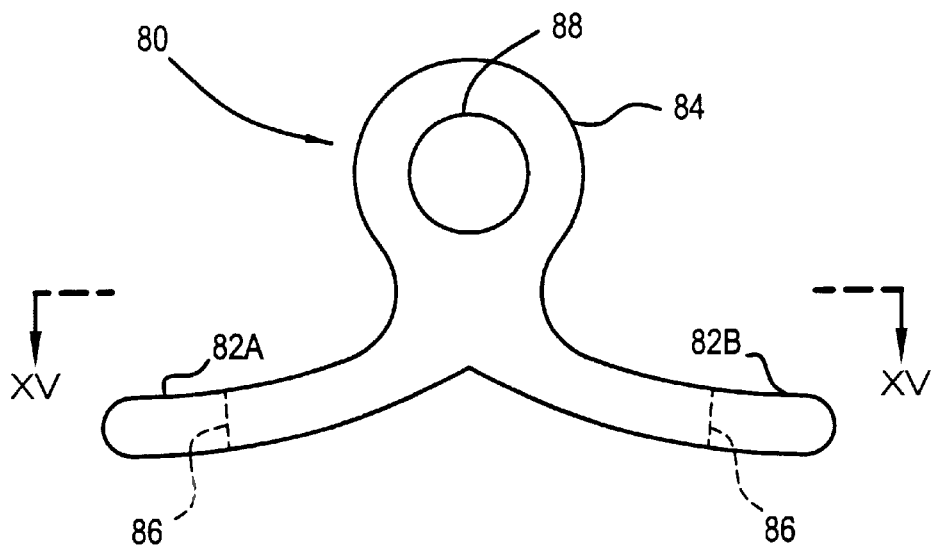
FIGS. 13–17 illustrate other preferred embodiments of cutting elements according to the present invention.
Figure 14:
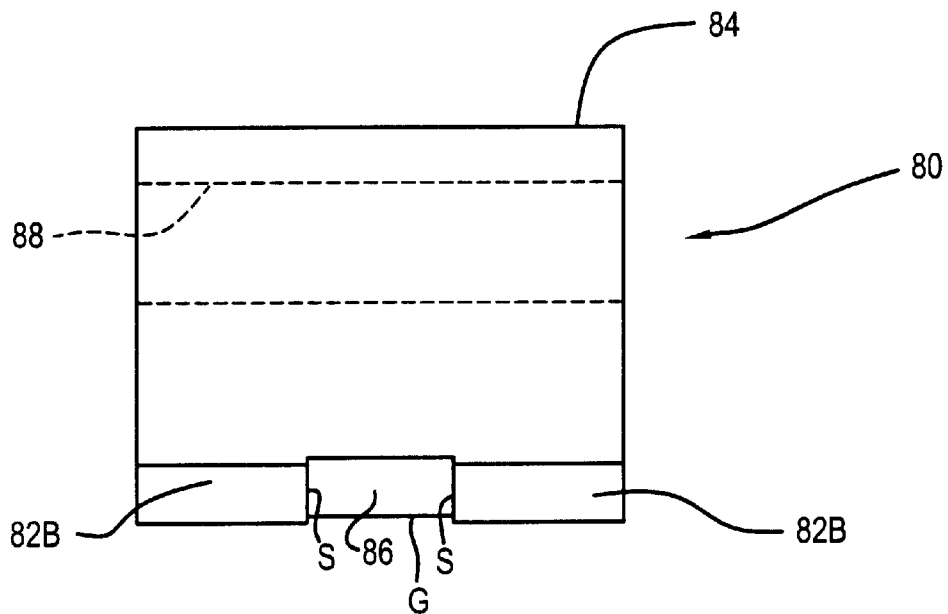
Figure 15:
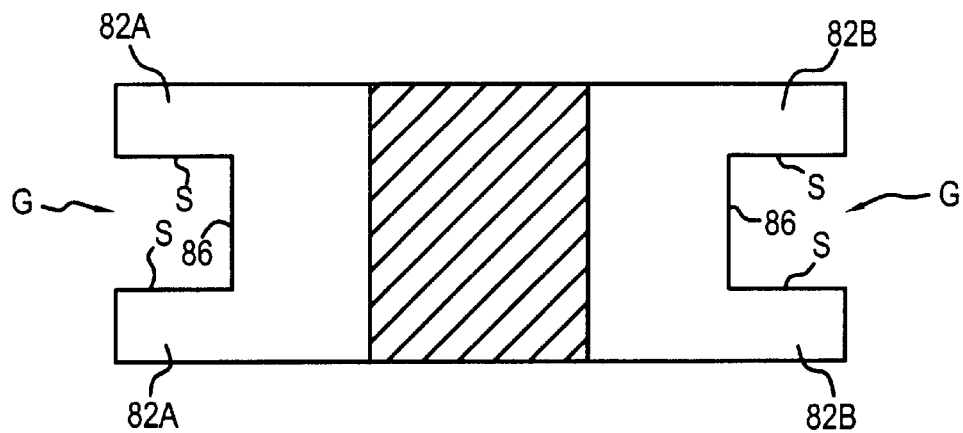

FIGS. 13–17 illustrate other preferred embodiments of cutting assemblies according to the present invention. FIGS. 13–15 illustrate a cutting hammer 80 having a collar 84 with a through hole 88 and cutting elements 82A and 82B. The cutting hammer 80 is similar to the cutting hammer 26' shown in FIGS. 4B and 4C. However, the cutting hammer 80 includes a cutout portion defined by a backwall 86 and sidewalls S (FIGS. 14 and 15). In contrast with the embodiments of FIGS. 5–9C, the embodiments of FIGS. 13–17 do not require a separate holder member 106 and/or the additional assembly steps for cutting elements 204. However, a gap G in FIGS. 13–15 serves the same purpose as the gap G shown in FIG. 6, and therefore will not be explained further. In FIG. 14, the gap G appears to be fairly shallow, whereas FIG. 15 is a cross-sectional view of FIG. 13 and shows the sidewalls S as having a depth that is fairly significant.

Figure 15A:
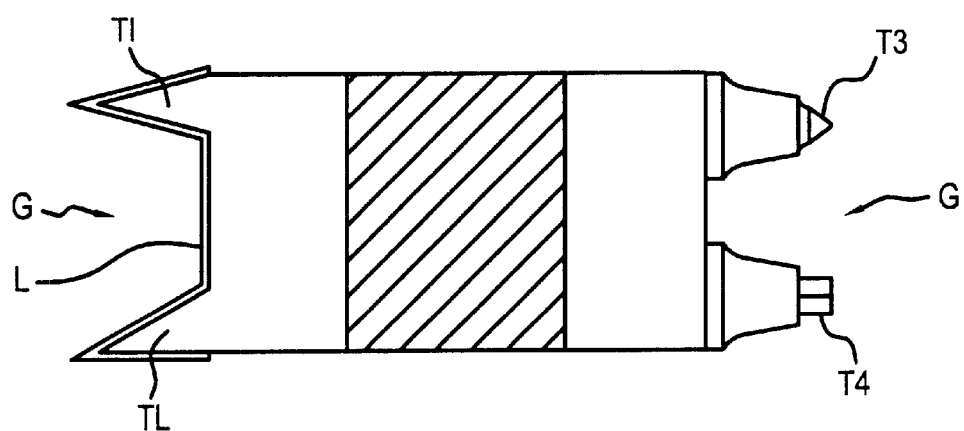

FIG. 15A shows representative modifications of the cross-sectional view shown in FIG. 15. For example, the cutting hammer in FIG. 15A may include cutting tips T1–T4 having various shapes and dimensions. For example, cutting tip T1 may have a substantially conical shape, whereas cutting tip T2 may have a substantially annular shape in cross section, with appropriate spacing between adjacent tips along the circumference of the collar. The cutting tip T2 may also have a first wall that is coplanar with the side surface of the cutting hammer and a second wall that is angled with respect to the first wall. Moreover, the cutting tips T1 and T2 may be molded or cast as a one piece unit with the collar and remaining elements of the cutting hammer. Furthermore, the cutting tips T1 and T2 can be coated with a layer L of protective material, such as tungsten and/or carbide. The layer L may also be formed in the region between the cutting tips T1 and T2.

Cutting tips T3 and T4 are similar to those shown in FIGS. 9A–9C. The cuttings tips T3 and T4 have shapes that are selected depending on the type of vegetation to be mulched and/or mowed. In addition, the cutting tips T3 and T4 can be attached to the main body of the cutting hammer by any conventional fashion, such as by welding, gluing, screwing, mechanical lock, etc. It is to be understood that all of the cutting tips for any one cutting hammer preferably have the same shape, but that FIG. 15A shows a single cutting hammer having four different cutting tips for illustrative purposes. However, cutting tips, e.g., cutting tips T3 and T4, can be combined in various fashions if the type of vegetation involved proves to be more efficiently cut using a combination of different types of cutting tips rather than a single type of cutting tip.

Figure 15B:
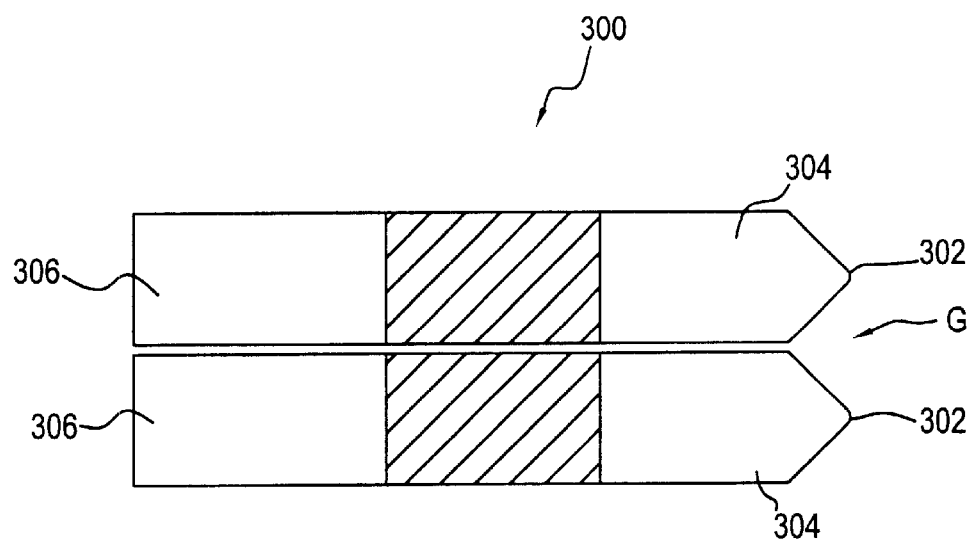
Figure 15C:
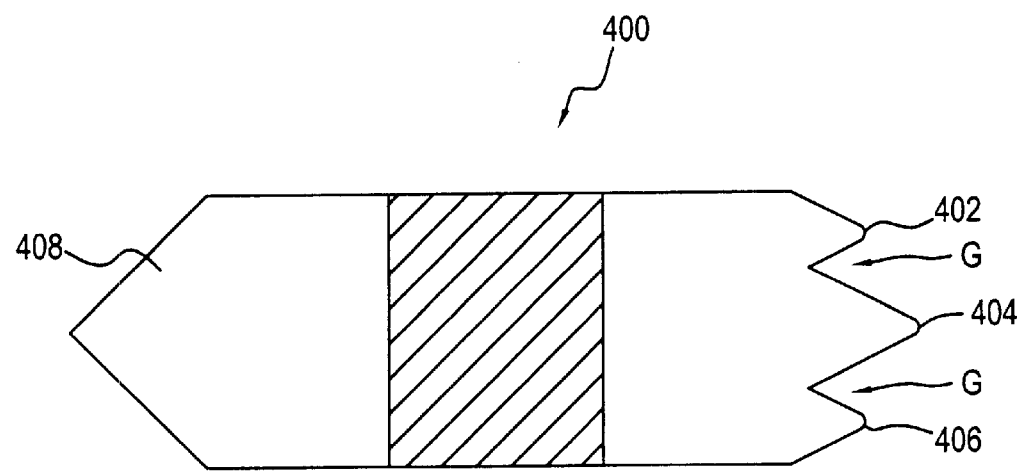

FIGS. 15B and 15C show further preferred embodiments of cutting hammers according to the present invention. FIGS. 15B and 15C are cross-sectional views similar to those shown in FIGS. 15 and 15A.

FIG. 15B shows a cutting hammer 300 having cutting tips 302 that are spaced apart to define a predetermined gap G therebetween. Each cutting tip 302 is formed to have a triangular or tapered shape, as shown. However, cutting tips 306 may have a generally rectangular cross section, as shown.

Moreover, the cutting tips 302, 306 are mounted on support elements halves 304 that are independently rotatable with respect to one another. The total thickness of the combined support element halves 304 is roughly the same as the thickness of the support element shown in FIG. 15. Also, the support element halves 304 may be rotatably fastened to one another using a rotary coupling member (not shown) that allows the support element halves 304 to rotate with respect to one another as well as on a support rod, e.g., support rod 24 (FIG. 3).

FIG. 15C shows a cutting hammer 400 having cutting tips 402, 404 and 406, with gaps G formed between tips 402 and 404 and tips 404 and 406. The tip 404 may be larger than the tips 402 and 406. The tips 402, 404, 406 have a substantially triangular or tapered shaped, as shown. Further, rather than a series of three tips, the cutting assembly may employ a single cutting tip 408 that has a substantially tapered or triangular shape.

Figure 16:
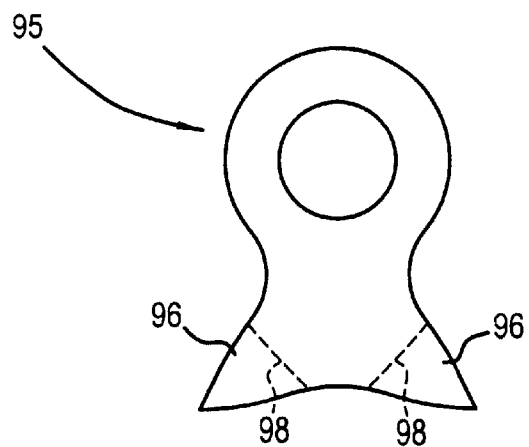
Figure 16A:
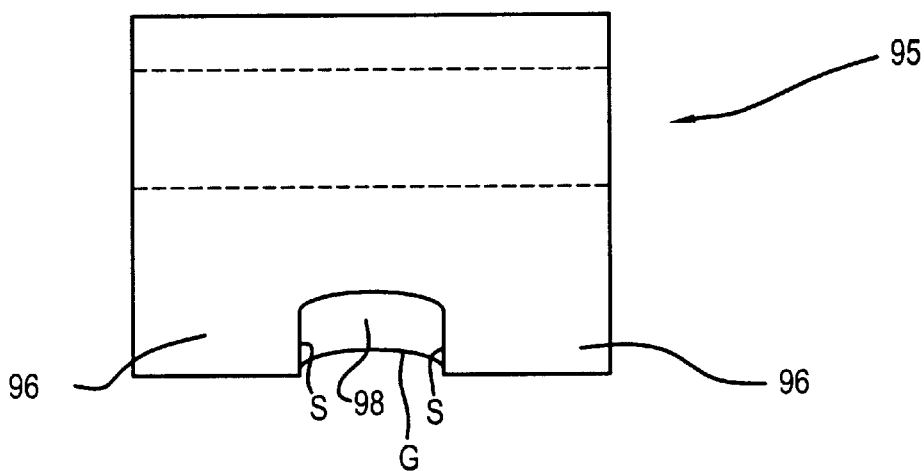
Figure 17:
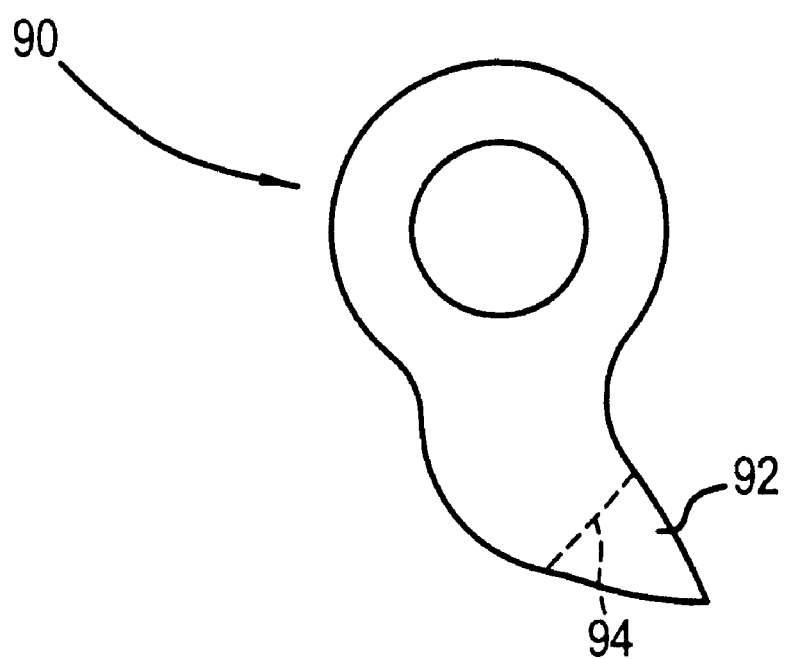

FIGS. 16, 16A and 17 show additional embodiments of other preferred cutting hammers according to the present invention. For example, FIGS. 16 and 16A show a cutting hammer 95 including cutting elements 96 that include a cutout portion defined in part by a backwall 98 and sidewalls S, shown in FIG. 16A, which is a side elevation view of FIG. 16. The dimensions, shape and orientation of the backwall 98 can be determined based on experimental testing. The primary difference between the cutting hammer 95 in FIGS. 16 and 16A and the cutting hammer 80 in FIGS. 13–15 resides in the size and shape of the cutting elements 96 versus the shape of the cutting elements 82A and 82B in FIGS. 13–15. In addition, FIG. 17 shows a cutting hammer 90 including cutting elements 92 that are spaced apart a predetermined amount to form a gap (not shown) defined in part by backwall 94. In contrast with the cutting hammer 95 of FIG. 16, the cutting hammer 90 of FIG. 17 only includes a single row of cutting elements rather than two rows of cutting elements. Further, other features described in combination with other embodiments can be used in connection with the embodiments of FIGS. 13–17. For example, the cutting tips/elements can be structured to contact a cutting surface in stepwise fashion, as described in conjunction with FIG. 8A.

While the invention has been described in conjunction with preferred embodiments thereof, it is evident that many alternatives, modifications and variations may be apparent to those skilled in the art. For example, while the cutting assemblies according to the preferred embodiments described are shown to include two cutting elements, the present invention also contemplates cutting assemblies including a single removable or non-removable cutting element. In addition, while the shafts of the cutting elements preferably include a circular cross section, which allows rotation of the cutting elements within the holder members of the support elements, the shafts may also be of a non-circular cross section that allows the cutting elements to reciprocate but not rotate. Accordingly, preferred embodiments of the invention as set forth herein are intended to be illustrative, not limiting. Various changes may be made without departing from the spirit and scope of the preferred illustrated embodiments.

What is claimed is:

1. A cutting hammer for use with a mulching unit of a mulching apparatus, comprising:

a support element having a collar defining an inner surface freely rotatably and slidably mounted to a support rod of the mulching unit, the support rod being offset from an axis of rotation of the mulching unit; and at least first and second cutting elements provided to the collar and being spaced apart from one another by a predetermined gap.

2. The cutting hammer of claim 1, wherein the two cutting elements contact a cutting surface in stepwise fashion.

3. The cutting hammer of claim 1, wherein the first and second cutting elements include shaped cutting tips made from at least one of tungsten and carbide.

4. The cutting hammer of claim 1, wherein the first and second cutting elements have shaped cutting tips and a layer made of at least one of tungsten and carbide that covers at least the shaped cutting tips.

5. The cutting hammer of claim 1, wherein the first and second cutting elements do not move with respect to the collar.

6. The cutting hammer of claim 5, wherein the first and second cutting elements are integrally formed with the collar.

7. The cutting hammer of claim 5, wherein the first and second cutting elements are formed as one piece with the collar.

8. The cutting hammer of claim 6, wherein the support element comprises first and second support element halves that rotate independently from one another, and the first cutting element is provided to the first support element half and the second cutting element is provided to the second support element half.

9. The cutting hammer of claim 8, wherein the first and second cutting elements include first and second cutting tips having tapered sidewalls that converge to define the gap.

* * * * *